(12) United States Patent
Kawai et al.

(10) Patent No.: US 10,918,991 B2
(45) Date of Patent: Feb. 16, 2021

(54) DRYER APPARATUS AND AIR SUSPENSION SYSTEM

(71) Applicant: HITACHI AUTOMOTIVE SYSTEMS, LTD., Ibaraki (JP)

(72) Inventors: Yoshinori Kawai, Ebina (JP); Tsutomu Ito, Sagamihara (JP); Kan Kobayashi, Yokohama (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 9 days.

(21) Appl. No.: 16/332,520

(22) PCT Filed: Sep. 13, 2017

(86) PCT No.: PCT/JP2017/032956
§ 371 (c)(1),
(2) Date: Mar. 12, 2019

(87) PCT Pub. No.: WO2018/074107
PCT Pub. Date: Apr. 26, 2018

(65) Prior Publication Data
US 2019/0201840 A1 Jul. 4, 2019

(30) Foreign Application Priority Data
Oct. 21, 2016 (JP) .............................. JP2016-207056

(51) Int. Cl.
*B01D 53/04* (2006.01)
*B60G 17/04* (2006.01)
*B01D 53/26* (2006.01)
(Continued)

(52) U.S. Cl.
CPC ....... *B01D 53/261* (2013.01); *B01D 53/0415* (2013.01); *B01D 53/0454* (2013.01);
(Continued)

(58) Field of Classification Search
CPC .............. B60G 17/015; B01D 53/0407; B01D 53/0415; B01D 53/26; B60T 17/004
(Continued)

(56) References Cited

U.S. PATENT DOCUMENTS 3,464,186 A * 9/1969 Walker .................. B01D 53/26
96/115
3,881,743 A * 5/1975 Whelan .............. B60G 17/0155
280/6.157
(Continued)

FOREIGN PATENT DOCUMENTS

| EP | 1 233 183 | 8/2002 |
|---|---|---|
| JP | 09-250507 | 9/1997 |

(Continued)

OTHER PUBLICATIONS

International Search Report dated Nov. 7, 2017 in International (PCT) Application No. PCT/JP2017/032956.

*Primary Examiner* — Christopher P Schwartz
(74) *Attorney, Agent, or Firm* — Wenderoth, Lind & Ponack, L.L.P.

(57) ABSTRACT

An air suspension system includes an air suspension, a compressor, a dryer apparatus, and so forth. The dryer apparatus includes a dryer case, an inner cylinder, a first inlet port, a first outlet port, a first desiccant, an outer cylinder, a second inlet port, a second outlet port, a second other-end side filter, a second desiccant, and so forth. The first desiccant comprises a molecular sieve, for example, which exhibits high water adsorption performance at high temperature. On the other hand, the second desiccant comprises silica gel, for example, which exhibits high water adsorption performance at low temperature.

7 Claims, 9 Drawing Sheets

(51) Int. Cl.
  *B60G 17/015* (2006.01)
  *F04B 41/00* (2006.01)
  *B60T 17/00* (2006.01)
  *F04B 39/16* (2006.01)

(52) U.S. Cl.
  CPC ...... *B60G 17/015* (2013.01); *B01D 2253/106* (2013.01); *B01D 2253/108* (2013.01); *B01D 2259/414* (2013.01); *B01D 2259/4143* (2013.01); *B01D 2259/4145* (2013.01); *B01D 2259/4148* (2013.01); *B01D 2259/4566* (2013.01); *B60G 2500/2021* (2013.01); *B60T 17/004* (2013.01); *F04B 39/16* (2013.01); *F04B 41/00* (2013.01)

(58) Field of Classification Search
  USPC ............. 267/64.16, 64.19, 64.21; 280/6.157, 280/124.16; 55/487, 517, DIG. 17; 96/134–143
  See application file for complete search history.

(56) References Cited

U.S. PATENT DOCUMENTS

| | | | |
|---|---|---|---|
| 5,300,138 A | 4/1994 | Fischer et al. | |
| 5,711,150 A | 1/1998 | Oshita et al. | |
| 6,000,432 A | 12/1999 | Trapp et al. | |
| 6,723,154 B2* | 4/2004 | Olsson | B01D 46/0036 55/487 |
| 6,730,143 B1* | 5/2004 | Nichols | B01D 53/261 95/118 |
| 7,544,234 B2* | 6/2009 | Fornof | B60T 17/004 96/117.5 |
| 7,846,242 B2* | 12/2010 | Paling | B60T 17/004 96/134 |
| 7,909,920 B2* | 3/2011 | Amesoeder | B01D 53/0407 96/131 |
| 8,216,350 B2* | 7/2012 | Honjo | B01D 53/0415 55/517 |
| 8,852,327 B1* | 10/2014 | Adams | B01D 46/0039 96/108 |
| 2009/0165643 A1 | 7/2009 | Huberland | |

FOREIGN PATENT DOCUMENTS

| | | |
|---|---|---|
| JP | 3061609 | 7/2000 |
| JP | 2003-511638 | 3/2003 |
| JP | 2009-530087 | 8/2009 |
| JP | 2015-105020 | 6/2015 |
| WO | 01/26783 | 4/2001 |

\* cited by examiner

DRYER APPARATUS AND AIR SUSPENSION SYSTEM

TECHNICAL FIELD

The present invention relates to a dryer apparatus and an air suspension system which are installed in a vehicle, for example, a four-wheeled automobile.

BACKGROUND ART

Vehicles such as four-wheeled automobiles include those equipped with an air suspension system for performing vehicle height adjustment. An air suspension system according to a conventional technique of the type described above has a compressor compressing air and a dryer apparatus for removing water from the compressed air (for example, see Patent Literatures 1 and 2).

CITATION LIST

Patent Literatures

PTL 1: European Patent No. 1233183
PTL 2: Japanese Patent No. 3061609

SUMMARY OF INVENTION

Technical Problem

Incidentally, dryer apparatus have the following characteristics: at a part of a dryer apparatus into which compressed air from the compressor flows, the compressed air is at high temperature, and at a part of the dryer apparatus from which compressed air flows out, the compressed air is at low temperature. In this regard, the dryer apparatus according to the conventional technique has a single type of desiccant inside to remove water from compressed air. Compressed air passing through the dryer apparatus, however, has a wide temperature range; therefore, there is a problem that it is difficult to effectively remove water from the compressed air with a single type of desiccant.

An object of the present invention is to provide a dryer apparatus and an air suspension system which are capable of effectively removing water from compressed air even if compressed air has a wide temperature range.

Solution to Problem

A dryer apparatus according to one embodiment of the present invention is provided with a plurality of different types of desiccants filled therein to dry compressed air.

An air suspension system according to one embodiment of the present invention has an air suspension interposed between a vehicle body and an axle to perform vehicle height adjustment in accordance with supply and discharge of air; a compressor compressing air; and the dryer apparatus provided at a delivery side of the compressor.

According to one embodiment of the present invention, it is possible to effectively remove water from compressed air even if a temperature range is wide, by using the plurality of different types of desiccants.

DESCRIPTION OF EMBODIMENTS

An air suspension system with a dryer apparatus according to each embodiment of the present invention will be explained below in detail with reference to the accompanying drawings, taking as an example a case where the air suspension system is installed in a vehicle, e.g. a four-wheeled automobile.

Figure 1:
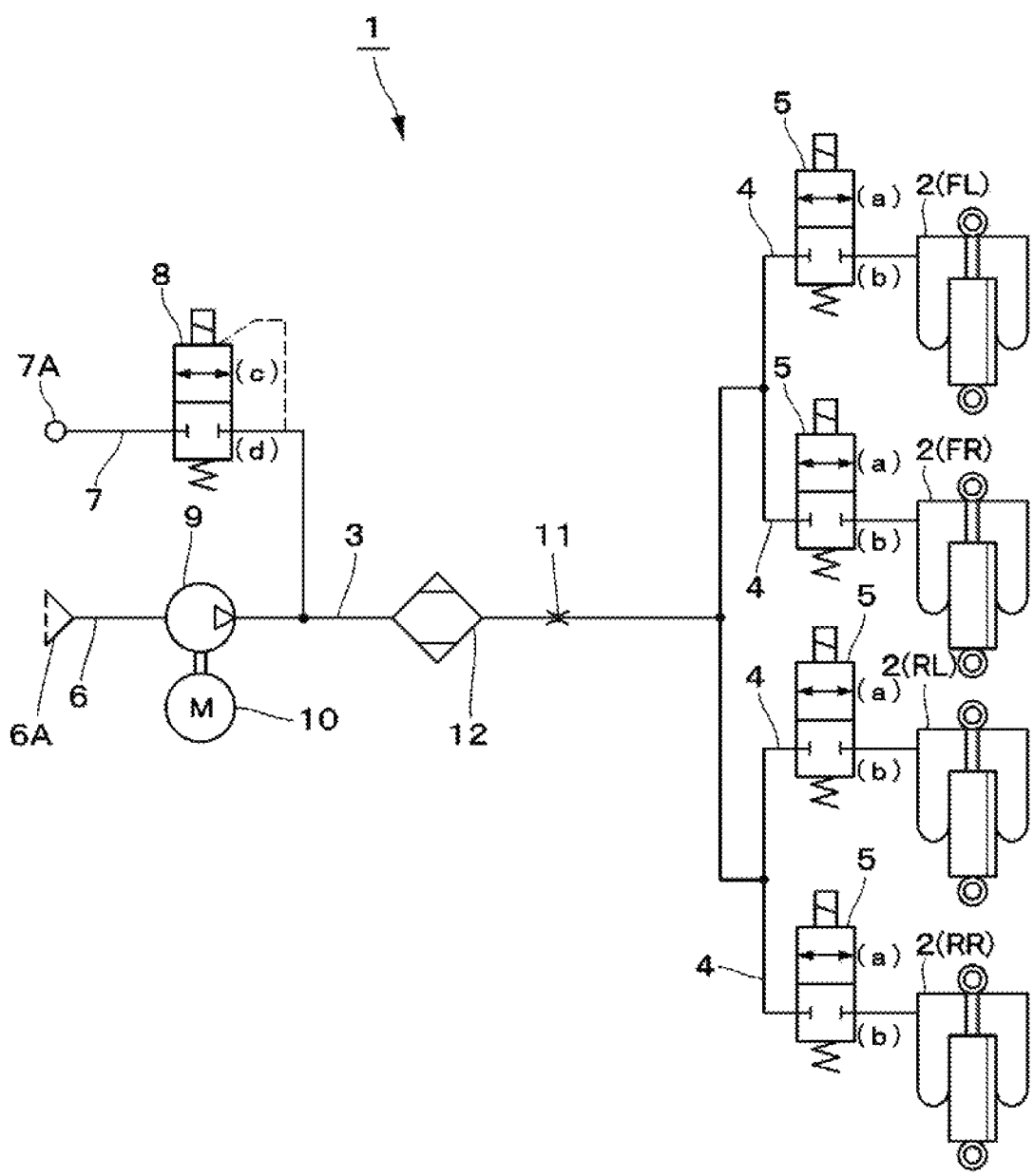
FIG. 1 is a circuit diagram showing the overall structure of an air suspension system according to a first embodiment.
Figure 2:
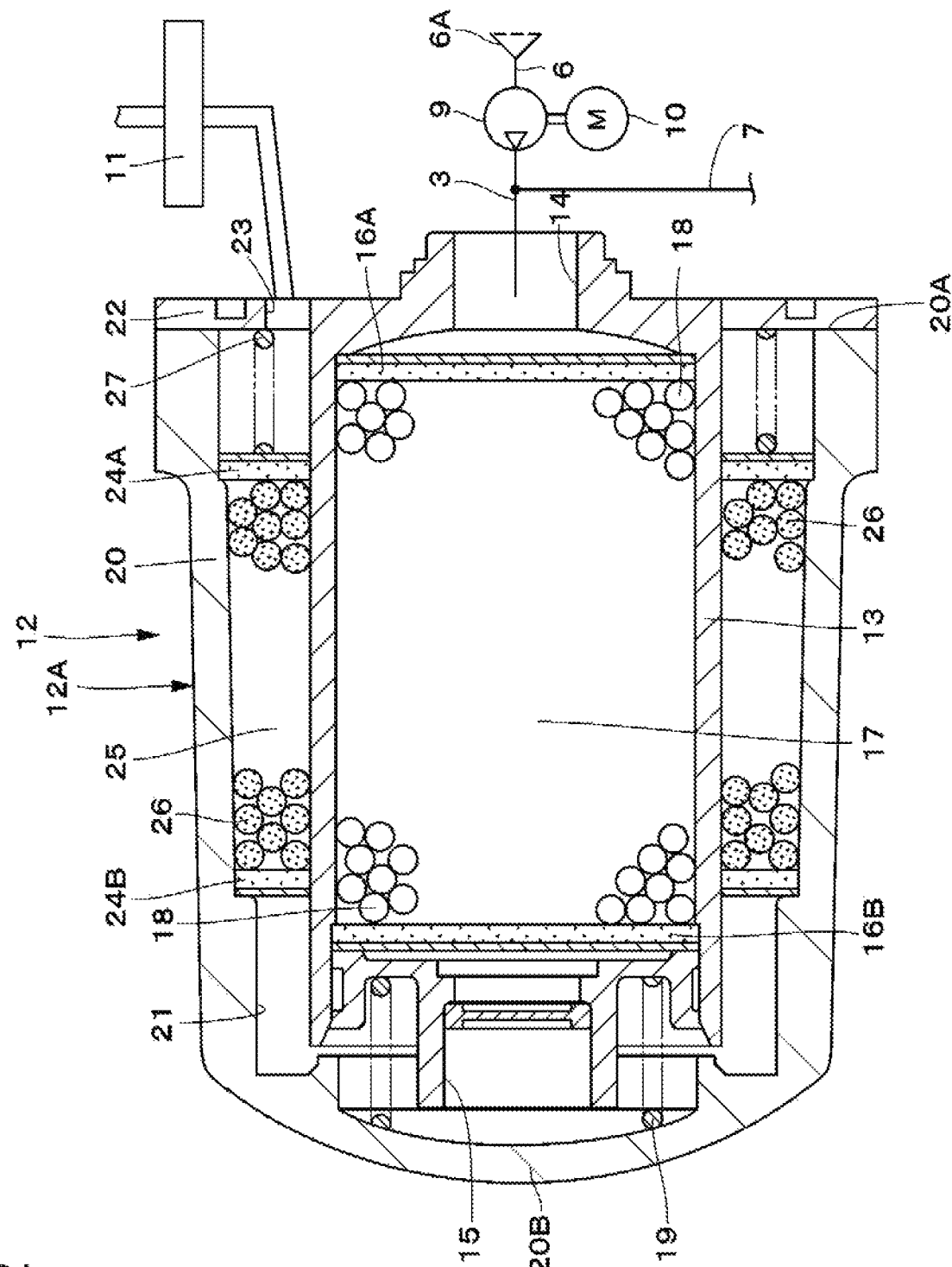
FIG. 2 is an enlarged sectional view of a dryer apparatus in FIG. 1.

FIGS. 1 to 5 show a first embodiment of the present invention. In FIG. 1, an air suspension system 1 for automotive use includes air suspensions 2, a compressor 9, a dryer apparatus 12, and so forth. In this case, the air suspension system 1 is constructed as an open type air suspension system having no tank for storing compressed air.

The air suspensions 2 are interposed between a body of a vehicle and associated axles (neither shown) at respective positions on the front and rear wheel sides of the vehicle. More specifically, there are provided four air suspensions 2 in association with a front left wheel (FL) located on a front side, a front right wheel (FR) located on the front side, a rear left wheel (RL) located on a rear side, and a rear right wheel (RR) located on the rear side, respectively. The air suspensions 2 are configured such that when compressed air is supplied thereto or discharged therefrom, the air suspensions 2 extend or contract vertically according to the amount of air supplied or discharged (compressed air volume) at that time, thereby performing height adjustment of the vehicle. The air suspensions 2 are connected to the dryer apparatus 12 (described later) through a supply-discharge line 3 and respective branch lines 4.

The supply-discharge line 3 is connected to the delivery side of the compressor 9 at one end thereof, which is located at the upstream side of the supply-discharge line 3, and connected to the branch lines 4 at the other end thereof, which is located at the downstream side of the supply-discharge line 3. On the other hand, each branch line 4 is connected to the supply-discharge line 3 at one end thereof, which is located at the upstream side of the branch line 4, and connected to the associated air suspension 2 at the other end thereof, which is located at the downstream side of the branch line 4. The supply-discharge line 3 and the branch lines 4 perform supply and discharge of compressed air to and from the air suspensions 2.

Air supply-discharge valves 5 are each provided in the middle of the associated branch line 4 between the associated air suspension 2 and the dryer apparatus 12. Each air supply-discharge valve 5 comprises an ON-OFF type electromagnetic valve and is selectively switchable between an open position (a) where the air supply-discharge valve 5 opens the associated branch line 4 to allow supply or discharge of compressed air to or from the associated air suspension 2, and a closed position (b) where the air supply-discharge valve 5 closes the associated branch line 4 to block the supply or discharge of compressed air to or from the associated air suspension 2.

A suction line 6 is provided to connect to the suction side of the compressor 9. The suction line 6 is always in communication with the atmosphere to allow air sucked in through an intake filter 6A to flow into the compressor 9 therethrough.

An air discharge line 7 is provided to connect to the supply-discharge line 3 at a position between the compressor 9 and the dryer apparatus 12. When an air discharge valve 8 is opened, the air discharge line 7 allows compressed air in the air discharge line 7 to be discharged (released) into the atmosphere through an air discharge port 7A.

The air discharge valve 8 is provided in the middle of the air discharge line 7. The air discharge valve 8 is a valve configured to selectively provide or cut off communication between the atmosphere and the air discharge line 7, which is connected to the supply-discharge line 3. The air discharge valve 8 comprises an ON-OFF type electromagnetic valve and is selectively switchable between an open position (c) where the air discharge valve 8 opens the air discharge line 7 to allow discharge of compressed air from the air discharge port 7A, and a closed position (d) where the air discharge valve 8 closes the air discharge line 7 to block the discharge of compressed air from the air discharge port 7A.

The compressor 9 comprises a reciprocating compressor or a scroll compressor, for example, which is provided between the supply-discharge line 3 and the suction line 6. The compressor 9 is driven by an electric motor 10 as a drive source, e.g. a linear motor, a DC motor, or an AC motor, to compress air sucked from the suction line 6 side, thereby generating compressed air. The compressor 9 delivers and supplies the compressed air toward the dryer apparatus 12. In this case, the compressed air from the compressor 9 may be delivered at a high temperature of about 100° C., for example.

An orifice 11 is provided in the middle of the supply-discharge line 3 between the dryer apparatus 12 and the branch lines 4. The orifice 11 constitutes a restrictor restricting the flow rate of compressed air flowing through the supply-discharge line 3. Consequently, compressed air passes through the supply-discharge line 3 at a slow speed, which makes it possible to improve the water adsorption (drying) performance of the dryer apparatus 12.

The dryer apparatus 12 is provided in the middle of the supply-discharge line 3 between the delivery side of the compressor 9 and the orifice 11. The dryer apparatus 12 has a dryer case 12A constituting a casing of the dryer apparatus 12. The dryer case 12A is provided therein with first filters 16A and 16B, a first drying chamber 17, a first desiccant 18, a first spring 19, second filters 24A and 24B, a second drying chamber 25, a second desiccant 26, and a second spring 27, which will be described later.

Here, the dryer case 12A is constructed by including an inner cylinder 13, a first inlet port 14, a first outlet port 15, an outer cylinder 20, a second inlet port 21, a lid 22, and a second outlet port 23.

The inner cylinder 13 is formed in a cylindrical shape as a hollow container made of a metal material, e.g. aluminum. The inner cylinder 13 constitutes a first drying cylinder filled with a first desiccant 18 drying compressed air. The inner cylinder 13 has a first inlet port 14 formed at one end thereof so that compressed air from the compressor 9 flows into the inner cylinder 13 through the first inlet port 14. The first inlet port 14 provides communication between the supply-discharge line 3 and a first drying chamber 17 in the inner cylinder 13. On the other hand, the inner cylinder 13 has a first outlet port 15 formed at the other end thereof so that compressed air flows out of the inner cylinder 13 into the outer cylinder 20 through the first outlet port 15.

The inner cylinder 13 has a first one-end side filter 16A provided therein at one end side in the axial direction thereof, and a first other-end side filter 16B provided therein at the other end side in the axial direction thereof. These filters 16A and 16B prevent any part of the first desiccant 18 from flowing out to the outside. In this case, the first one-end side filter 16A and the first other-end side filter 16B define therebetween a first drying chamber 17 in the inner cylinder 13. The first drying chamber 17 is filled with the first desiccant 18. Between the first other-end side filter 16B and an other-end side inner peripheral surface (bottom 20B) of the outer cylinder 20 is provided a first spring 19 constantly urging the first other-end side filter 16B toward the first one-end side filter 16A.

The first desiccant 18 is filled in the first drying chamber 17 between the first one-end side filter 16A and the first other-end side filter 16B. The first desiccant 18 adsorbs water from compressed air. The first desiccant 18 exhibits high water adsorption performance at high temperature, as shown by a characteristic curve A represented by the solid line in FIG. 3. The first desiccant 18 comprises a molecular sieve (a kind of zeolite), for example.

The outer cylinder 20 constitutes an outer shell of the dryer apparatus 12, which is provided to cover the entire outer periphery of the inner cylinder 13 in coaxial relation thereto. The outer cylinder 20 is formed in a bottomed cylindrical shape as a hollow container made of a metal material, e.g. aluminum, which is open at one end side thereof as an opening end 20A and closed at the other end side thereof as a bottom 20B. In this case, the dryer case 12A of the dryer apparatus 12 is formed in a double-cylinder structure by the inner cylinder 13 and the outer cylinder 20.

The outer cylinder 20 has a second inlet port 21 formed at the bottom 20B side thereof. The second inlet port 21 provides communication between the inner cylinder 13 and the outer cylinder 20 so that compressed air flowing out from the first outlet port 15 flows into the outer cylinder 20 through the second inlet port 21. On the other hand, the outer cylinder 20 has the lid 22 provided at the opening end 20A side thereof, the lid 22 being formed as an annular plate. The lid 22 closes the opening end 20A of the outer cylinder 20. The lid 22 is formed with a second outlet port 23 through which compressed air flows out of the outer cylinder 20 toward the orifice 11 (supply-discharge line 3). The second outlet port 23 provides communication between the orifice 11 (supply-discharge line 3) and a second drying chamber 25 in the outer cylinder 20. The outer cylinder 20 constitutes a second drying cylinder filled with a second desiccant 26 drying compressed air. The outer cylinder 20 and the lid 22 constitute a part of the dryer case 12A.

The outer cylinder 20 has a second one-end side filter 24A provided therein at one end side thereof. The second one-end side filter 24A is located radially outside the inner cylinder 13. The outer cylinder 20 further has a second other-end side filter 24B provided therein at the other end side thereof. The second other-end side filter 24B is located radially outside the inner cylinder 13. These filters 24A and 24B prevent any part of the second desiccant 26 from flowing out to the outside. The second other-end side filter 24B is located between the second inlet port 21 and the second outlet port 23 to constitute a partition member separating the first desiccant 18 and the second desiccant 26 from each other.

In this case, the second one-end side filter 24A and the second other-end side filter 24B define therebetween the second drying chamber 25 in the outer cylinder 20. The second drying chamber 25 is located radially outside the inner cylinder 13. The second drying chamber 25 is filled with the second desiccant 26 (different in type from the first desiccant 18). Between the second one-end side filter 24A and the lid 22 is provided a second spring 27 constantly urging the second one-end side filter 24A toward the second other-end side filter 24B.

The second desiccant 26 is filled in the second drying chamber 25. The second desiccant 26 adsorbs water from compressed air. The second desiccant 26 exhibits high water adsorption performance at low temperature, as shown by a characteristic curve B represented by the dashed line in FIG. 3. The second desiccant 26 comprises silica gel, for example. In this case, the first desiccant 18 is higher than the second desiccant 26 in water adsorption performance when compressed air is at high temperature. The first desiccant 18 and the second desiccant 26 are filled in series in the flow direction of compressed air. That is, the first drying chamber 17 and the second drying chamber 25 are disposed in series in the dryer case 12A.

Figure 3:
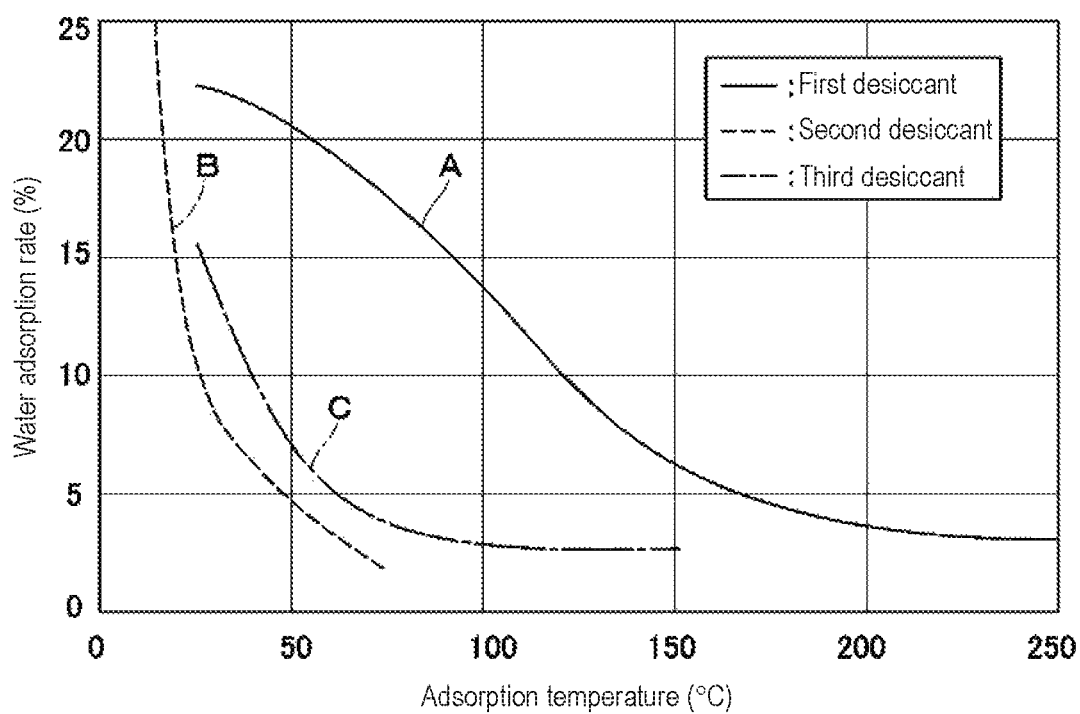
FIG. 3 is a characteristic diagram showing temperature characteristics of first to third desiccants.

Here, as shown in FIG. 3, the first desiccant 18 having the characteristic curve A is higher in water adsorption rate than the second desiccant 26 having the characteristic curve B in a high temperature region where the adsorption temperature is about 100° C. On the other hand, in a low temperature region where the adsorption temperature is about 20° C., the second desiccant 26 is higher in water adsorption rate than the first desiccant 18. Consequently, the dryer apparatus 12 adsorbs water from compressed air in accordance with temperature conditions of compressed air. A third desiccant having a characteristic curve C shown by the one-dot chain line in FIG. 3 comprises activated alumina, for example. The third desiccant has characteristics intermediate between those of the first and second desiccants 18 and 26.

In addition, the outer cylinder 20 and the inner cylinder 13 are so formed that the cubic capacity of the outer cylinder 20 (specifically, the cubic capacity of the second drying chamber 25) is larger than the cubic capacity of the inner cylinder 13 (specifically, the cubic capacity of the first drying chamber 17). Consequently, the second desiccant 26 in the second drying chamber 25 is larger in desiccant filling quantity than the first desiccant 18 in the first drying chamber 17. The second outlet port 23 and the first outlet port 15 are so formed that the area of the second outlet port 23 is smaller than that of the first outlet port 15. Consequently, when compressed air passes through the dryer apparatus 12, water is more readily adsorbed therefrom by the second desiccant 26 than by the first desiccant 18.

The following is an explanation of the operation of the air suspension system 1 according to the first embodiment having the above-described structure.

First, when the vehicle height is to be raised by the air suspensions 2, the air supply-discharge valves 5 are switched from the closed positions (b) to the open positions (a), respectively, and the air discharge valve 8 is held in the closed position (d). In this state, the compressor 9 is activated to operate. Consequently, the compressor 9 sucks ambient air thereinto through the intake filter 6A and the suction line 6, pressurizes (compresses) the air, and delivers compressed air toward the dryer apparatus 12.

Figure 4:
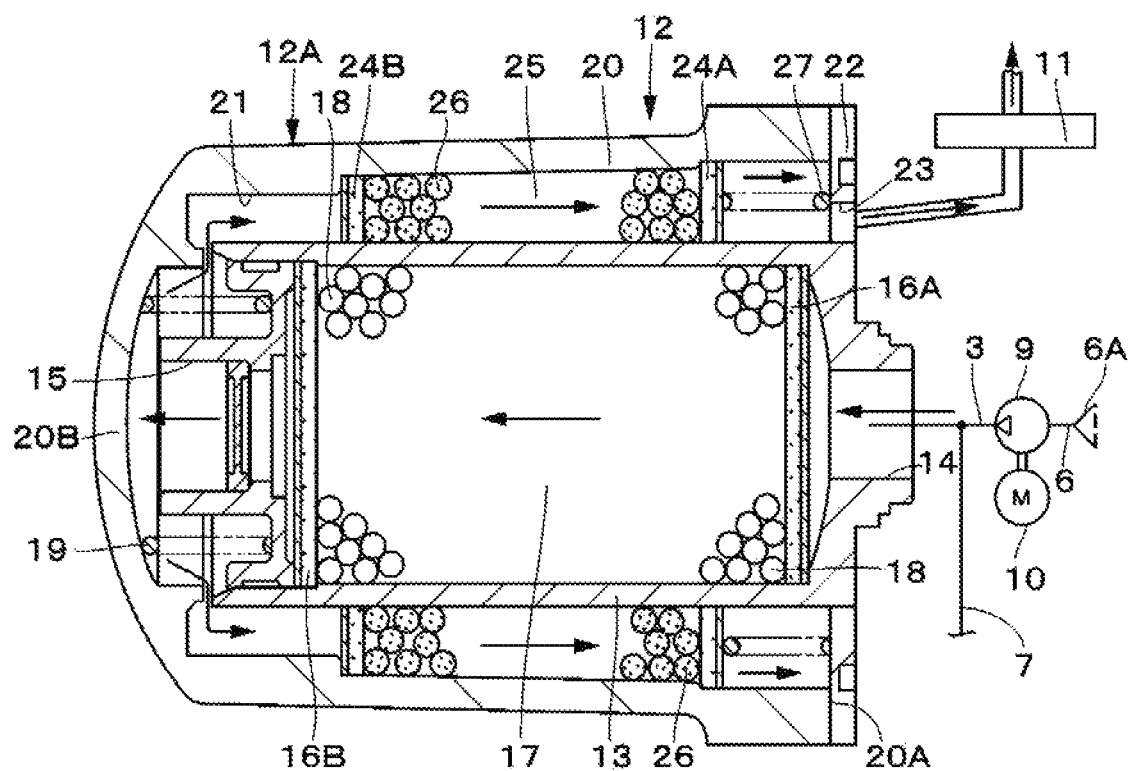
FIG. 4 is a sectional view showing the flow of compressed air in the dryer apparatus when compressed air is supplied from a compressor toward air suspensions.

Compressed air delivered from the compressor 9 enters the inner cylinder 13 of the dryer apparatus 12 to flow in the forward direction through the first inlet port 14, the first one-end side filter 16A, the first drying chamber 17, the first other-end side filter 16B, and the first outlet port 15 (see FIG. 4). Thereafter, the compressed air enters the outer cylinder 20 to flow in the forward direction through the second inlet port 21, the second other-end side filter 24B, the second drying chamber 25, the second one-end side filter 24A, and the second outlet port 23 toward the orifice 11.

In this case, the first drying chamber 17, which is close to the delivery side of the compressor 9, is supplied through the first inlet port 14 with compressed air at a high temperature (e.g. about 100° C.) generated by the compressor 9. The first drying chamber 17 contains the first desiccant 18, which exhibits high water adsorption performance at high temperature. Therefore, the first desiccant 18 adsorbs water from the high-temperature compressed air generated by the compressor 9. The second drying chamber 25, which is away from the compressor 9, is supplied with compressed air cooled to a lower temperature (e.g. about 20° C.) than the compressed air in the first drying chamber 17. The second drying chamber 25 contains the second desiccant 26, which exhibits high water adsorption performance at low temperature. Therefore, the second desiccant 26 adsorbs water from the compressed air at low temperature. The compressed air dried by the dryer apparatus 12 is supplied to the air suspensions 2 through the orifice 11, the supply-discharge line 3, and the branch lines 4.

After completion of the vehicle height raising operation, the air supply-discharge valves 5 are switched from the open positions (a) to the closed positions (b) to close the branch lines 4, respectively. Thus, the flow of compressed air to the air suspensions 2 is cut off to keep the air suspensions 2 in the extended positions, thereby allowing the vehicle height to be maintained in the raised position.

On the other hand, when the vehicle height is to be lowered, the air supply-discharge valves 5 are switched from the closed positions (b) to the open positions (a), respectively, and the air discharge valve 8 is switched from the closed position (d) to the open position (c). Consequently, compressed air in the air suspensions 2 is discharged to the dryer apparatus 12 through the branch lines 4, the supply-discharge line 3, and the orifice 11.

Figure 5:
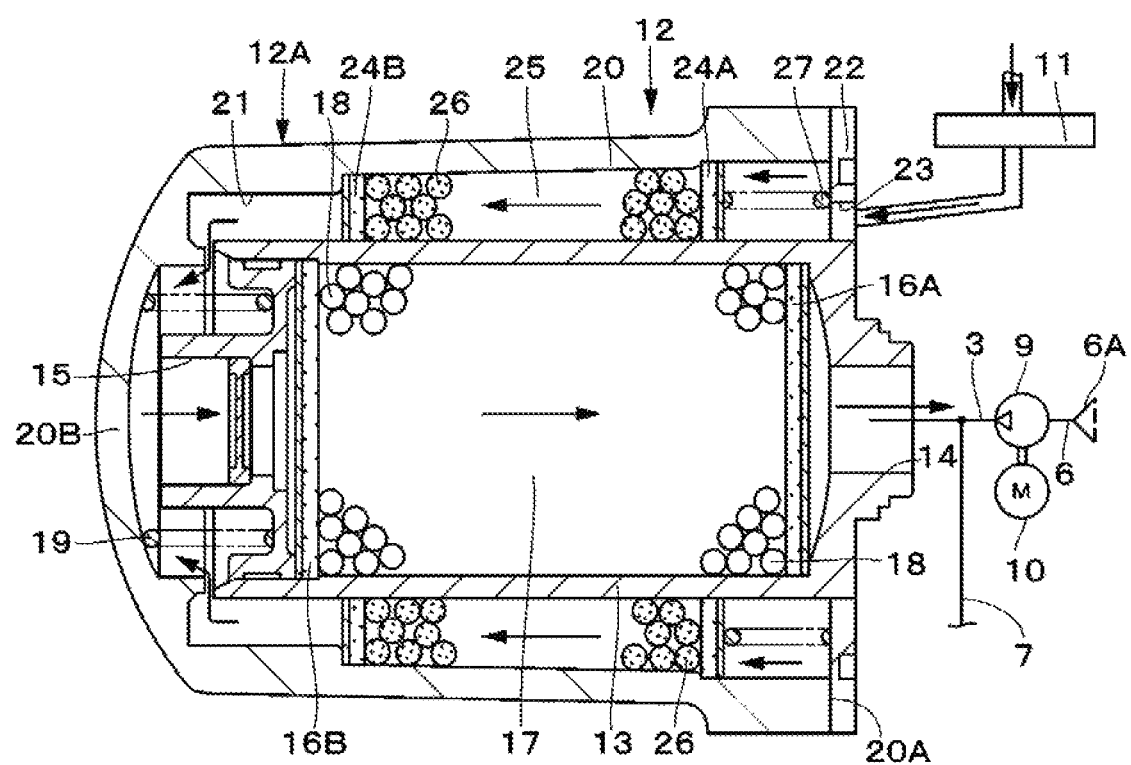
FIG. 5 is a sectional view showing the flow of compressed air in the dryer apparatus when compressed air is discharged from the air suspensions toward the compressor.

The compressed air discharged from the air suspensions 2 enters the outer cylinder 20 of the dryer apparatus 12 to flow in the backward direction through the second outlet port 23, the second one-end side filter 24A, the second drying chamber 25, the second other-end side filter 24B, and the second inlet port 21 (see FIG. 5). Thereafter, the compressed air enters the inner cylinder 13 to flow in the backward direction through the first outlet port 15, the first other-end side filter 16B, the first drying chamber 17, the first one-end side filter 16A, and the first inlet port 14.

In this case, dry air flows backward through the dryer apparatus 12; therefore, the first and second desiccants 18 and 26 in the dryer apparatus 12 are desorbed of water by the dry air. Thus, the first and second desiccants 18 and 26 are regenerated and restored to be able to adsorb water.

The compressed air having passed through the dryer apparatus 12 is discharged directly to the outside through the air discharge line 7, the air discharge valve 8, and the air discharge port 7A. As a result, compressed air is discharged from the air suspensions 2, and the air suspensions 2 change over to contracted positions, thereby enabling the vehicle height to be lowered.

Thus, the air suspension system 1 according to the first embodiment has the compressor 9 compressing air and the dryer apparatus 12 provided at the delivery side of the compressor 9. The dryer apparatus 12 has the inner cylinder 13 filled with the first desiccant 18 and the outer cylinder 20 filled with the second desiccant 26 to dry compressed air. Consequently, it is possible to remove water from compressed air more effectively than with the dryer apparatus using only a singe type of desiccant.

That is, the dryer apparatus 12 has first and second desiccants 18 and 26 which are different in temperature characteristics from each other. Accordingly, the dryer apparatus 12 can use desiccants suitable for a temperature condition of compressed air and is therefore capable of effectively removing water from compressed air. In other words, it is possible to ensure the water adsorption performance of the dryer apparatus 12 independent of the temperature of compressed air. Further, compressed air can be dried sufficiently even when the amount of use of desiccant is reduced.

Further, the air suspension system 1 has the first inlet port 14 through which compressed air flows in; then inner cylinder 13 filled with the first desiccant 18 drying compressed air flowing in through the first inlet port 14; the first outlet port 15 through which compressed their flows out of the inner cylinder 13; the second inlet port 21 through which compressed air flowing out from the first outlet port 15 flows in; the outer cylinder 20 filled with the second desiccant 26 drying compressed air flowing in through the second inlet port 21; and the second outlet port 23 through which compressed air flows out of the outer cylinder 20. The first desiccant 18 is higher than the second desiccant 26 in water adsorption performance when compressed air is at high temperature.

Thus, the dryer apparatus 12 has the first and second desiccants 18 and 26 different in temperature characteristics from each other in the inner and outer cylinders 13 and 20, respectively. Accordingly, the first and second desiccants 18 and 26 can be disposed in respective parts suitable for a temperature condition of compressed air. Consequently, it is possible to dispose the first desiccant 18, which exhibits high water adsorption performance at high temperature, in a part where high-temperature compressed air passes, and to dispose the second desiccant 26, which exhibits high water adsorption performance at low temperature, in a part where low-temperature compressed air passes. Accordingly, the dryer apparatus 12 can effectively remove water from compressed air in accordance with the temperature conditions of compressed air.

Further, the dryer apparatus 12 has the first desiccant 18 and the second desiccant 26 filled in series in the flow direction of compressed air. Consequently, it is possible to dispose the first desiccant 18 in a part close to the delivery side of the compressor 9 and to dispose the second desiccant 26 in a part away from the compressor 9.

Further, the outer cylinder 20 of the dryer apparatus 12 is provided to cover the entire outer periphery of the inner cylinder 13, the outer cylinder 20 constituting a part of the dryer case. Thus, the dryer apparatus 12 can be formed in a double-cylinder structure. Consequently, the second drying chamber 25, which is filled with the second desiccant 26, can be disposed between the outer peripheral surface of the inner cylinder 13 and the inner peripheral surface of the outer cylinder 20.

Further, the dryer apparatus 12 has the second other-end side filter 24B provided between the second inlet port 21 and the second outlet port 23 to separate the first desiccant 18 and the second desiccant 26 from each other. Consequently, it is possible to suppress the first desiccant 18 and the second desiccant 26 from mixing with each other.

Further, the dryer apparatus 12 is configured such that the cubic capacity of the outer cylinder 20 is larger than that of the inner cylinder 13. Accordingly, it is possible to increase the cubic capacity of the second drying chamber 25 in which the second desiccant 26 is filled. Hence, the desiccant filling quantity of the second desiccant 26 can be made larger than that of the first desiccant 18. As a result, water in compressed air can be adsorbed more by the second desiccant 26 than by the first desiccant 18.

Further, the dryer apparatus 12 is configured such that the second outlet port 23 is smaller in size than the first outlet port 15. Accordingly, compressed air can be made to remain longer in the second drying chamber 25 than in the first drying chamber 17. Consequently, water in compressed air can be adsorbed more by the second desiccant 26 than by the first desiccant 18.

Figure 6:
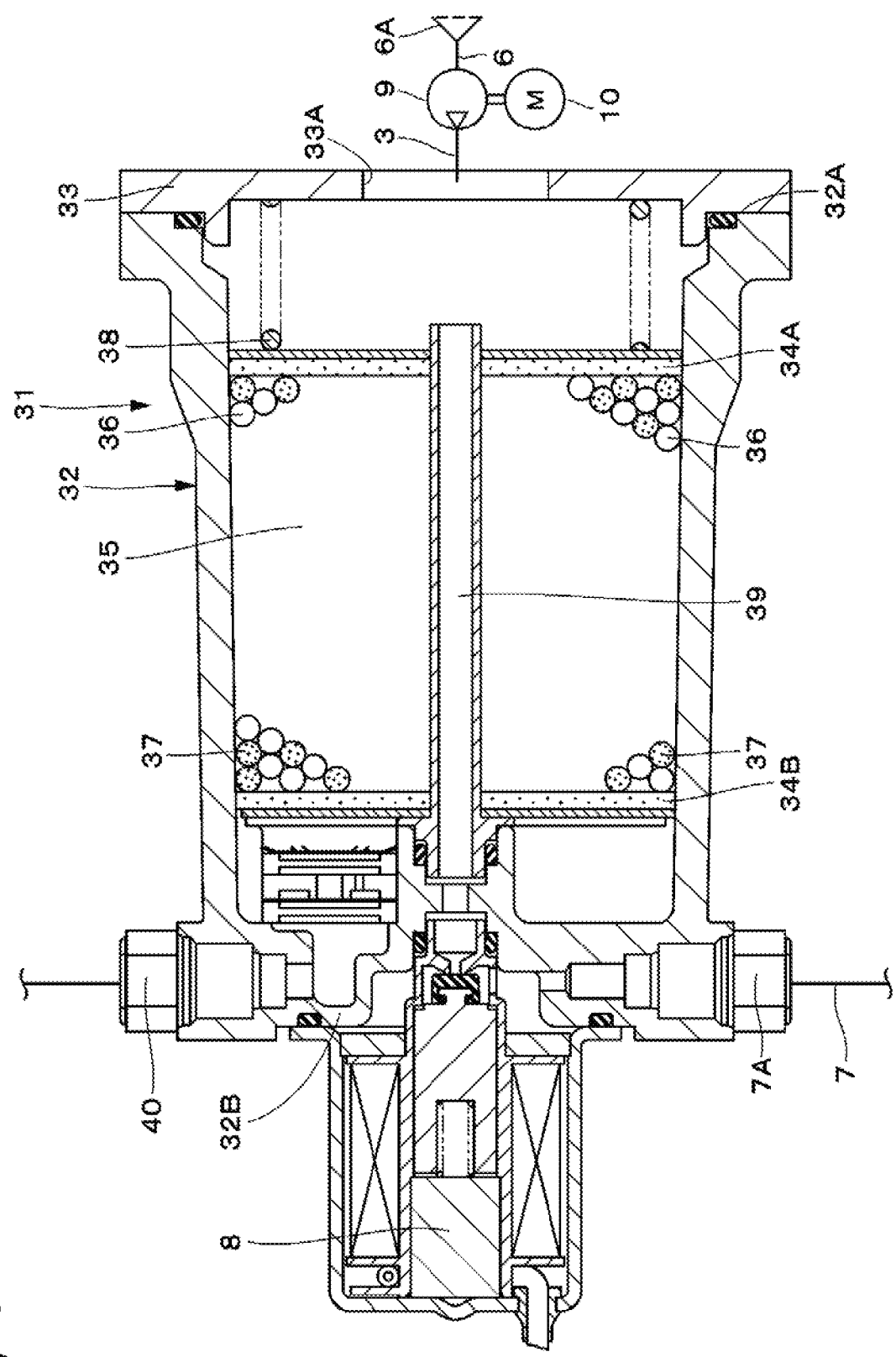
FIG. 6 is a sectional view showing a dryer apparatus according to a second embodiment.

Next, FIG. 6 shows a second embodiment of the present invention. The feature of the second embodiment resides in that the dryer apparatus has a single-cylinder structure and is provided therein with a mixture of a plurality of different types of desiccants. It should be noted that, in the second embodiment, the same constituent elements as those of the above-described first embodiment are denoted by the same reference numerals as those used in the first embodiment, and a description thereof is omitted.

In FIG. 6, a dryer apparatus 31 is constructed by including a dryer case 32, a lid 33, filters 34A and 34B, a drying chamber 35, first and second desiccants 36 and 37, a spring 38, an air discharge pipe 39, and an outlet port 40.

The dryer apparatus 31 is configured as follows. When compressed air supplied from the compressor 9 flows in the forward direction toward the orifice 11, the first and second desiccants 36 and 37 adsorb water from the compressed air. Thereafter, the dryer apparatus 31 supplies dry compressed air (dry air) toward the air suspensions 2. On the other hand, compressed air (exhaust air) flowing in the backward direction from the air suspensions 2 toward the air discharge line 7 desorbs water from the first and second desiccants 36 and 37 by flowing backward through the dryer apparatus 31, thereby regenerating the first and second desiccants 36 and 37.

The dryer case 32 is formed in a bottomed cylindrical shape as a hollow container made of a metal material, e.g. aluminum, which is open at one end side thereof as an opening end 32A and closed at the other end side thereof as a bottom 32B. The opening end 32A of the dryer case 32 is engaged with the lid 33. Thus, the lid 33 closes the opening end 32A of the dryer case 32. The lid 33 is formed with an inlet port 33A through which compressed air from the compressor 9 flows into the dryer case 32. Thus, the inlet port 33A provides communication between the supply-discharge line 3 and the drying chamber 35 in the dryer case 32.

The dryer case 32 has a one-end side filter 34A provided therein at one end side thereof, and an other-end side filter 34B provided therein at the other end side thereof. These filters 34A and 34B prevent any part of the first and second desiccants 36 and 37 from flowing out to the outside. The one-end side filter 34A and the other-end side filter 34B define therebetween a drying chamber 35 in the dryer case 32. The drying chamber 35 is filled with the first and second desiccants 36 and 37. Between the other-end side filter 34B and the lid 33 is provided a spring 38 constantly urging the other-end side filter 34B toward the one-end side filter 34A.

The first and second desiccants 36 and 37 are filled in the drying chamber 35 in a uniformly mixed state. The first and second desiccants 36 and 37 adsorb water from compressed air to dry the compressed air. The first desiccant 36 comprises a molecular sieve, for example, which exhibits high water adsorption performance at high temperature. On the other hand, the second desiccant 37 comprises silica gel, for example, which exhibits high water adsorption performance at low temperature. That is, the first desiccant 36 is higher than the second desiccant 37 in water adsorption performance when compressed air is at high temperature.

The air discharge pipe 39 extends through the filters 34A and 34B between them to provide communication between one- and other-end sides of the dryer apparatus 12. The air discharge pipe 39 communicates at one end thereof with a space between the one-end side filter 34A and the lid 33 and at the other end thereof with the air discharge port 7A through the air discharge valve 8.

The outlet port 40 is provided in the bottom 32B of the dryer case 32 at the other end side of the dryer apparatus 12. The outlet port 40 is connected to the air suspensions 2 through the supply-discharge line 3 to allow compressed air dried by the dryer apparatus 31 to flow toward the air suspensions 2.

The following is an explanation of the operation of the dryer apparatus 31 according to the second embodiment having the above-described structure.

First, when the vehicle height is to be raised by the air suspensions 2, the air supply-discharge valves 5 are switched from the closed positions (b) to the open positions (a), respectively, and the air discharge valve 8 is held in the closed position (d). In this state, the compressor 9 is activated to operate. Consequently, the compressor 9 sucks ambient air thereinto through the intake filter 6A and the suction line 6, pressurizes (compresses) the air, and delivers compressed air toward the dryer apparatus 31.

The compressed air delivered from the compressor 9 enters the dryer apparatus 31 to flow in the forward direction through the inlet port 33A, the one-end side filter 34A, the drying chamber 35, the other-end side filter 34B, and the outlet port 40. In this case, the drying chamber 35 contains the first desiccant 36, which exhibits high water adsorption performance at high temperature, and the second desiccant 37, which exhibits high water adsorption performance at low temperature. Therefore, the dryer apparatus 31 adsorbs water from the compressed air regardless of the temperature of compressed air. The compressed air dried by the dryer apparatus 31 is supplied to the air suspensions 2 through the orifice 11, the supply-discharge line 3, and the branch lines 4.

After completion of the vehicle height raising operation, the air supply-discharge valves 5 are switched from the open positions (a) to the closed positions (b) to close the branch lines 4, respectively. Thus, the flow of compressed air to the air suspensions 2 is cut off to keep the air suspensions 2 in the extended positions, thereby allowing the vehicle height to be maintained in the raised position.

On the other hand, when the vehicle height is to be lowered, the air supply-discharge valves 5 are switched from the closed positions (b) to the open positions (a), respectively, and the air discharge valve 8 is switched from the closed position (d) to the open position (c). Consequently, compressed air in the air suspensions 2 is discharged to the dryer apparatus 31 through the branch lines 4, the supply-discharge line 3, and the orifice 11.

The compressed air discharged from the air suspensions 2 enters the dryer apparatus 31 to flow in the backward direction through the outlet port 40, the other-end side filter 34B, the drying chamber 35, the one-end side filter 34A, and the air discharge pipe 39. In this case, dry air flows backward through the dryer apparatus 31; therefore, the first and second desiccants 36 and 37 in the dryer apparatus 31 are desorbed of water by the dry air. Thus, the first and second desiccants 36 and 37 are regenerated and restored to be able to adsorb water.

The compressed air having passed through the dryer apparatus 31 is discharged directly to the outside through the air discharge valve 8, the air discharge port 7A, and so forth. As a result, compressed air is discharged from the air suspensions 2, and the air suspensions 2 change over to contracted positions, thereby enabling the vehicle height to be lowered.

Thus, the second embodiment can provide substantially the same operation and advantageous effects as those of the first embodiment. According to the second embodiment, the dryer apparatus 31 is formed in a single-cylinder structure by using the dryer case 32, and the first and second desiccants 36 and 37 are provided in the drying chamber 35 in a mixed state. Consequently, it is possible to remove water from compressed air more effectively than with a dryer apparatus using only a single type of desiccant.

Figure 7:
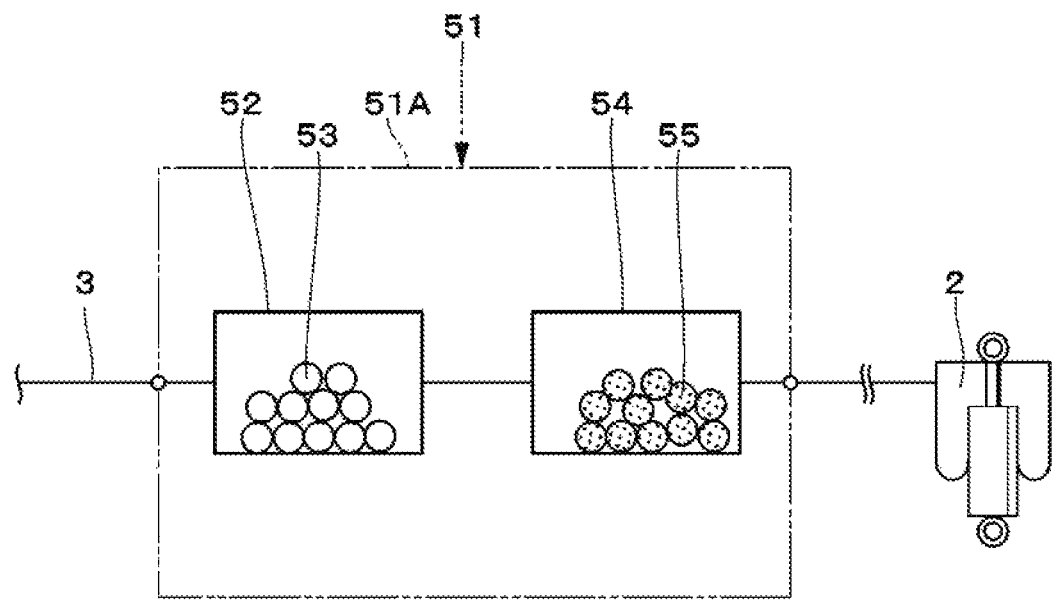
FIG. 7 is a configuration diagram showing the interior of a dryer apparatus according to a first modification.

It should be noted that, in the second embodiment, the first and second desiccants 36 and 37 are filled in the drying chamber 35 in a uniformly mixed state. The present invention, however, is not limited to the described structure but may be configured as in a first modification shown in FIG. 7, for example. That is, a dryer apparatus 51 has, in a dryer case 51A, a first drying cylinder 52 filled with a first desiccant 53, and a second drying cylinder 54 filled with a second desiccant 55. In this case, the first desiccant 53 and the second desiccant 55 are separated from each other and filled in series in the flow direction of compressed air.

Figure 8:
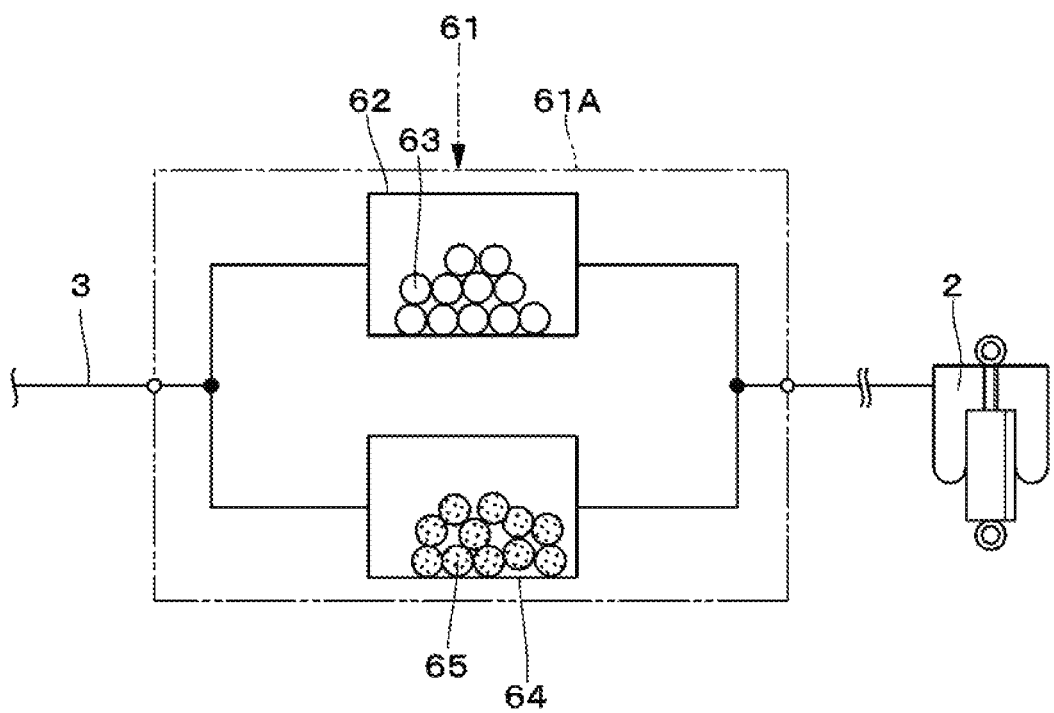
FIG. 8 is a configuration diagram showing the interior of a dryer apparatus according to a second modification.

Further, in the second embodiment, the first and second desiccants 36 and 37 are filled in the drying chamber 35 in a uniformly mixed state. The present invention, however, is not limited to the described structure but may be configured as in a second modification shown in FIG. 8, for example. That is, a dryer apparatus 61 has, in a dryer case 61A, a first drying cylinder 62 filled with a first desiccant 63, and a second drying cylinder 64 filled with a second desiccant 65. In this case, the first desiccant 63 and the second desiccant 65 are separated from each other and filled in parallel in the flow direction of compressed air.

Further, in the second embodiment, the first and second desiccants 36 and 37 are filled in the drying chamber 35 in a uniformly mixed state. The present invention, however, is not limited to the described structure. For example, the first and second desiccants may be unevenly mixed with each other in the drying chamber, instead of being uniformly mixed together. Further, the arrangement may also be such that the first and second desiccants are separated from each other in advance by using nets or the like, and these previously separated desiccants are filled in the drying chamber.

Figure 9:
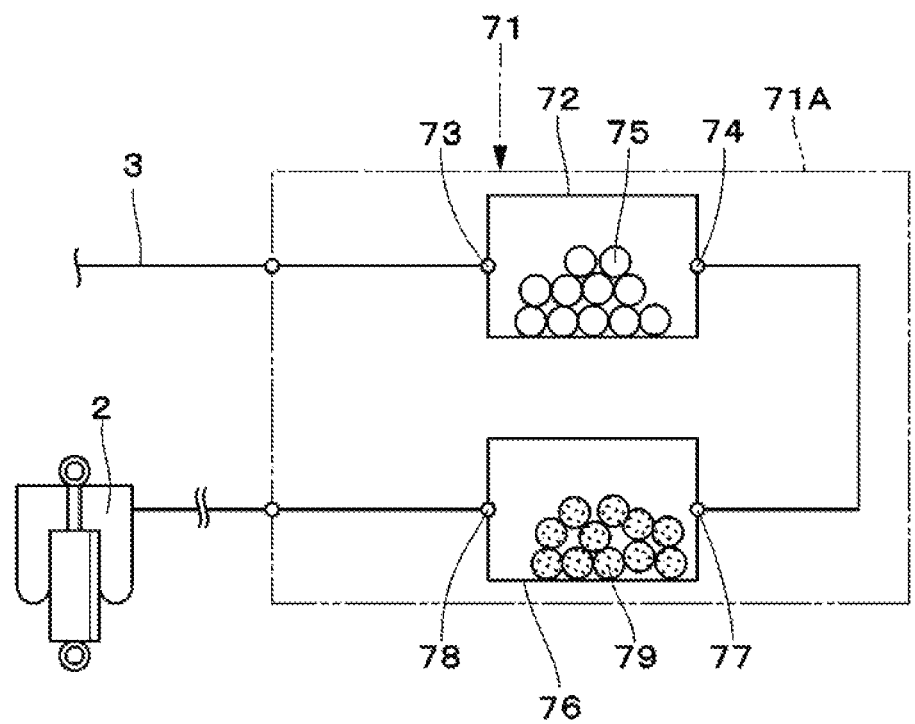
FIG. 9 is a configuration diagram showing the interior of a dryer apparatus according to a third modification.

Further, in the second embodiment, the dryer apparatus 31 is formed in a double-cylinder structure in which the outer cylinder 20, which constitutes a second drying cylinder, is disposed to cover the entire outer periphery of the inner cylinder 13, which constitutes a first drying cylinder. The present invention, however, is not limited to the described structure but may be configured as in a third modification shown in FIG. 9, for example. That is, a dryer apparatus 71 has a dryer case 71A, a first drying cylinder 72 filled with a first desiccant 75, and a second drying cylinder 76 filled with a second desiccant 79. The first drying cylinder 72 and the second drying cylinder 76 are disposed side by side in the dryer case 71A. A first inlet port 73 and a second outlet port 78 are located at one end in the axial direction, and a first outlet port 74 and a second inlet port 77 are located at the other end in the axial direction.

Figure 10:
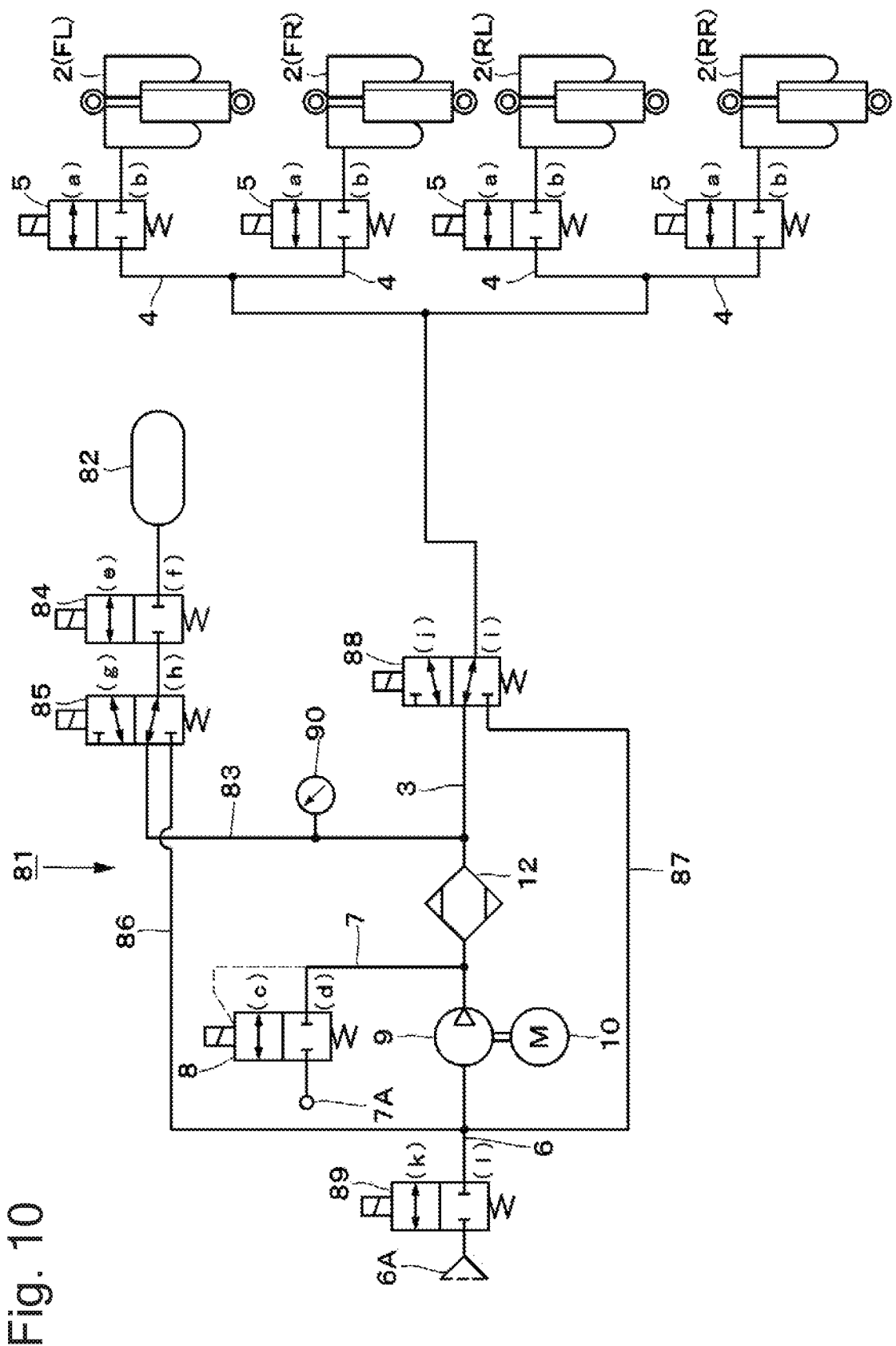
FIG. 10 is a circuit diagram showing the overall structure of a closed type air suspension system according to a fourth modification.

Further, in the first embodiment, the air suspension system 1 is constructed as an open type air suspension system. The present invention, however, is not limited to the described structure but may be configured as in a fourth modification shown in FIG. 10, for example. That is, an air suspension system 81 may be constructed as a closed type air suspension system having a tank 82 storing air discharged from the air suspensions 2. The same shall apply to the second embodiment.

Specifically, the tank 82 stores compressed air compressed by the compressor 9. The tank 82 and the compressor 9 are connected through the supply-discharge line 3 and a replenishing line 83. Thus, compressed air delivered from the compressor 9 is stored in the tank 82 through the supply-discharge line 3 and the replenishing line 83.

The replenishing line 83 is a line branching from the supply-discharge line 3 at a position between a supply-discharge switching valve 88 (described later) and the dryer apparatus 12 to replenish compressed air into the tank 82.

A tank valve 84 and a reservoir switching valve 85 are provided between the replenishing line 83 and the tank 82, for example. Of the two valves, the tank valve 84 comprises a 2-port, 2-position electromagnetic valve. The tank valve 84 is selectively switchable between an open position (e) where the tank valve 84 opens the replenishing line 83 to allow supply or discharge of gas to or from the tank 82, and a closed position (f) where the tank valve 84 closes the replenishing line 83 to block the supply or discharge of gas to or from the tank 82.

The reservoir switching valve 85 comprises, for example, a 3-port, 2-position electromagnetic direction switching valve to selectively connect the suction or delivery side of the compressor 9 to the tank 82. The reservoir switching valve 85 is selectively switchable between a supply-discharge position (g) where the reservoir switching valve 85 supplies or discharges compressed air to or from the tank 82 through the replenishing line 83, and a switching position (h) where the reservoir switching valve 85 supplies compressed air from the tank 82 to the suction side of the compressor 9 through a first bypass line 86.

The first bypass line 86 is disposed between the suction line 6 and the reservoir switching valve 85 to allow compressed air in the tank 82 to flow therethrough toward the suction side of the compressor 9 when the reservoir switching valve 85 is switched to the switching position (h).

A second bypass line 87 is disposed between the suction line 6 and the supply-discharge switching valve 88 to allow compressed air in the air suspensions 2 to flow therethrough toward the suction side of the compressor 9 when the supply-discharge switching valve 88 is switched to a switching position (j).

The supply-discharge switching valve 88 is provided in the middle of the supply-discharge line 3 between the air supply-discharge valves 5 and the compressor 9. The supply-discharge switching valve 88 comprises a 3-port, 2-position electromagnetic direction switching valve substantially in the same way as the reservoir switching valve 85.

Here, the supply-discharge switching valve 88 is selectively switchable between a supply-discharge position (i) where the supply-discharge switching valve 88 supplies or discharges compressed air to or from the air suspensions 2 through the supply-discharge line 3 and the respective branch lines 4, and a switching position (j) where the supply-discharge switching valve 88 supplies compressed air from the air suspensions 2 to the suction side of the compressor 9 through the second bypass line 87.

An intake valve 89 is a valve selectively providing or cutting off communication between the atmosphere and the suction line 6 connected to the suction side of the compressor 9. The intake valve 89 comprises a 2-port, 2-position electromagnetic valve substantially in the same way as the tank valve 84. The intake valve 89 is selectively switchable between an open position (k) where the intake valve 89 opens the suction line 6 to allow suction of gas by the compressor 9, and a closed position (l) where the intake valve 89 closes the suction line 6 to block the suction of gas by the compressor 9.

A pressure sensor 90 is provided in the middle of the replenishing line 83 between the reservoir switching valve 85 and the compressor 9. The pressure sensor 90 detects the pressure of compressed air in the tank 82 by detecting the pressure in the replenishing line 83.

Thus, the fourth modification is a closed-type air suspension system 81 having a tank 82. Therefore, compressed air compressed by the compressor 9 can be stored in the tank 82, and it is possible to suppress compressed air from being wastefully discharged from the air discharge valve 8.

Further, in the foregoing first embodiment, the dryer apparatus 12 is configured to be filled with two different types of desiccants, i.e. first and second desiccants 36 and 37. The present invention, however, is not limited to the described structure. The dryer apparatus may be configured to be filled with three or more different types of desiccants. For example, the dryer apparatus may be filled with a third desiccant having the characteristic curve C shown in FIG. 3. The same shall apply to the second embodiment.

Further, in the foregoing embodiments, there are provided four air suspensions 2 at respective positions on the front and rear wheel sides of the vehicle. The present invention, however, is not limited to the described structure but may be configured such that air suspensions are provided on either the front or rear wheel side of the vehicle. Further, the present invention may be applied not only to four-wheeled automobiles but also to other types of vehicles, e.g. two-wheeled vehicles.

Further, the foregoing embodiments are illustrative and, needless to say, the configurations described in the different embodiments can be partially replaced or combined with each other.

The following is a description of inventions included in the foregoing embodiments.

According to the present invention, the dryer apparatus is provided with a plurality of different types of desiccants filled therein to dry compressed air. This makes it possible to effectively remove water from compressed air.

According to a second aspect, the dryer apparatus according to the first aspect has the plurality of different types of desiccants provided being separated from each other. This makes it possible to effectively remove water from compressed air.

According to a third aspect, the dryer apparatus according to the second aspect has the plurality of different types of desiccants filled in series with or parallel to each other in the flow direction of compressed air. This makes it possible to effectively remove water from compressed air.

According to a fourth aspect, the dryer apparatus according to any of the first to third aspects has a dryer case. The dryer case includes a first inlet port through which compressed air flows in; a first drying cylinder filled with a first desiccant drying compressed air flowing in through the first inlet port; a first outlet port through which compressed air flows out of the first drying cylinder; a second inlet port through which compressed air flowing out from the first outlet port flows in; a second drying cylinder filled with a second desiccant drying compressed air flowing in from the second outlet port; and a second outlet port through which compressed air flows out of the second drying cylinder. The first desiccant is higher than the second desiccant in water adsorption performance when compressed air is at high temperature. This makes it possible to effectively remove water from compressed air in accordance with temperature conditions of compressed air.

According to a fifth aspect, the dryer apparatus according to the fourth aspect is configured as follows. The second drying cylinder is provided to cover the entire outer periphery of the first drying cylinder, the second drying cylinder constituting a part of the dryer case. The dryer apparatus further has a partition member provided between the second inlet port and the second outlet port to separate the first desiccant and the second desiccant from each other. Thus, the dryer apparatus is formed in a double-cylinder structure, and it is possible to suppress the first desiccant and the second desiccant from mixing with each other.

According to a sixth aspect, the dryer apparatus according to the fourth or fifth aspect is configured such that the second drying cylinder is larger in cubic capacity than the first drying cylinder. This makes it possible to increase a desiccant filling quantity of second desiccant that can be filled in the second drying cylinder.

According to a seventh aspect, the dryer apparatus according to any of the fourth to sixth aspects is configured such that the second outlet port is smaller in size than the first outlet port. This allows compressed air to remain longer in the second drying chamber than in the first drying chamber.

According to an eighth aspect, the dryer apparatus according to any of the fourth to seventh aspects is configured as follows. The first drying cylinder and the second drying cylinder are disposed side by side. The first inlet port and the second outlet port are located at one end in the axial direction, and the first outlet port and the second inlet port are located at the other end in the axial direction. This makes it possible to dispose the first drying cylinder and the second drying cylinder in series without forming the dryer apparatus in a double-cylinder structure.

According to a ninth aspect, there is provided an air suspension system having the dryer apparatus according to any of the first to eighth aspects. The air suspension system has an air suspension interposed between a vehicle body and an axle to perform vehicle height adjustment in accordance with supply and discharge of air; a compressor compressing air; and the dryer apparatus provided at the delivery side of the compressor. This makes it possible to supply the air suspension with compressed air from which water has been effectively removed.

According to a tenth aspect, the air suspension system according to the ninth aspect is provided with a tank storing air discharged from the air suspension. With this structure, the air suspension system can be constructed as a closed type air suspension system.

It should be noted that the present invention is not limited to the foregoing embodiments but includes various modifications. For example, the foregoing embodiments have been described in detail to easily explain the present invention. Therefore, the present invention is not necessarily limited to the embodiments having all the configurations described above. Further, a part of the configuration of a certain embodiment can be replaced with a configuration of another embodiment, and a configuration of a certain embodiment can be added to a configuration of another embodiment. Further, a part of the configuration of each embodiment can be eliminated or replaced with another configuration. It is also possible to add another configuration to the configuration of each embodiment.

The present application claims priority to Japanese Patent Application No. 2016-207056 filed on Oct. 21, 2016. The entire disclosure of Japanese Patent Application No. 2016-207056 filed on Oct. 21, 2016 including specification, claims, drawings and summary is incorporated herein by reference in its entirety.

REFERENCE SIGNS LIST

1, 81: air suspension system; 2: air suspension; 9: compressor; 12, 31, 51, 61, 71: dryer apparatus; 12A, 32, 51A, 61A, 71A: dryer case; 13: inner cylinder (first drying cylinder); 14, 73: first inlet port; 15, 74: first outlet port; 18, 36, 53, 63, 75: first desiccant; 20: outer cylinder (second drying cylinder); 21, 77: second inlet port; 23, 78: second outlet port; 24B: second other-end side filter (partition member); 26, 37, 55, 65, 79: second desiccant; 52, 62, 72: first drying cylinder; 54, 64, 76: second drying cylinder; 82: tank.

The invention claimed is:
1. A dryer apparatus comprising:
a plurality of different types of desiccants filled therein to dry compressed air, wherein the plurality of different types of desiccants are provided being separated from each other, and
wherein the plurality of different types of desiccants are provided in series with each other in a flow direction of compressed air,
the dryer apparatus further comprising a dryer case, the dryer case including:
a first inlet port through which compressed air flows in;
a first drying cylinder filled with a first desiccant that dries compressed air flowing in from the first inlet port;
a first outlet port through which compressed air flows out of the first drying cylinder;
a second inlet port in which compressed air flowing out from the first outlet port flows;
a second drying cylinder filled with a second desiccant that dries compressed air flowing in from the second inlet port; and
a second outlet port through which compressed air flows out of the second drying cylinder;
the first desiccant being higher than the second desiccant in water adsorption performance when compressed air is at high temperature.
2. The dryer apparatus of claim 1, wherein the second drying cylinder is provided to cover an entire periphery of the first drying cylinder, the second drying cylinder constituting a part of the dryer case;
a partition member being provided between the second inlet port and the second outlet port to separate the first desiccant and the second desiccant from each other.

3. The dryer apparatus of claim 1, wherein the second drying cylinder is larger in cubic capacity than the first drying cylinder.

4. The dryer apparatus of claim 1, wherein the second outlet port is smaller in size than the first outlet port.

5. The dryer apparatus of claim 1, wherein the first drying cylinder and the second drying cylinder are disposed side by side;
   the first inlet port and the second outlet port being located at one end in an axial direction; and
   the first outlet port and the second inlet port being located at an other end in the axial direction.

6. An air suspension system including the dryer apparatus of claim 1, the air suspension system comprising:
   an air suspension interposed between a vehicle body and an axle to perform vehicle height adjustment in accordance with supply and discharge of air;
   a compressor that compresses air; and
   the dryer apparatus provided at a delivery side of the compressor.

7. The air suspension system of claim 6, further comprising:
   a tank that stores air discharged from the air suspension.

* * * * *